(12) United States Patent
Bhide et al.

(10) Patent No.: US 9,179,491 B2
(45) Date of Patent: Nov. 3, 2015

(54) FACILITATING MOBILE PHONE CONVERSATIONS

(71) Applicant: International Business Machines Corporation, Armonk, NY (US)

(72) Inventors: Manish Bhide, Hyderabad (IN); Ajay Kumar Gupta, New Delhi (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/090,636

(22) Filed: Nov. 26, 2013

(65) Prior Publication Data

US 2015/0148012 A1        May 28, 2015

(51) Int. Cl.
*H04M 3/00*        (2006.01)
*H04W 76/06*        (2009.01)
*H04W 4/16*        (2009.01)
*H04M 1/725*        (2006.01)

(52) U.S. Cl.
CPC .......... *H04W 76/06* (2013.01); *H04M 1/72519* (2013.01); *H04W 4/16* (2013.01)

(58) Field of Classification Search
CPC ........... H04L 29/08108; H04W 8/245; H04M 1/72519
USPC .................................... 455/414.1, 418, 550.1
See application file for complete search history.

(56) References Cited

U.S. PATENT DOCUMENTS

| 7,233,788 | B2 | 6/2007 | Kedem | |
|---|---|---|---|---|
| 8,331,545 | B2 | 12/2012 | Lingafelt et al. | |
| 8,363,804 | B1 | 1/2013 | Adams | |
| 2006/0126806 | A1* | 6/2006 | Trandal et al. | 379/88.26 |
| 2009/0257572 | A1* | 10/2009 | Klein | 379/93.17 |
| 2010/0220846 | A1* | 9/2010 | Gisby et al. | 379/202.01 |
| 2012/0302214 | A1 | 11/2012 | Li | |
| 2014/0112457 | A1* | 4/2014 | Xing et al. | 379/32.01 |
| 2014/0364093 | A1* | 12/2014 | Weksler et al. | 455/414.1 |

FOREIGN PATENT DOCUMENTS

| CN | 102802137 | 11/2012 |
|---|---|---|
| WO | WO2004075513 A2 | 9/2004 |
| WO | WO2011116101 A1 | 9/2011 |

OTHER PUBLICATIONS

Author Unknown, "Record voice message offline after phone call disconnection," An IP.com Prior Art Database Technical Disclosure, IP.com No. IPCOM000202308D, Dec. 13, 2010, 4 pages.

(Continued)

*Primary Examiner* — Danh Le
(74) *Attorney, Agent, or Firm* — Ference & Associates LLC

(57) ABSTRACT

Methods and arrangements for managing termination of a telephone call. A contemplated method includes: detecting a request by a first party to terminate a telephone call between the first party and a second party; detecting whether the second party is still speaking after detecting the request to terminate the call; and automatically forestalling termination of the call if the second party is still speaking, via affording the first party an opportunity to continue the call, via at least one of: sending a confirmation request to the first party, and sending an audio signal to the first party. Other variants and embodiments are broadly contemplated herein.

15 Claims, 4 Drawing Sheets

(56) References Cited

OTHER PUBLICATIONS

Pegu, Uttam, "How to detect Disconnect or Call End using Analog CTI Boards," Feb. 21, 2010, 7 pages, URL: http://www.ivrsworld.com/uncategorized/how-to-detect-disconnect-or-call-end-using-analog-cti-boards, accessed Oct. 30, 2013.

Gookin, Dan, "Droid Bionic for Dummies," 2012, 22 pages, John Wiley & Sons, Inc., Hoboken, NJ, United States.

* cited by examiner

FACILITATING MOBILE PHONE CONVERSATIONS

BACKGROUND

Generally, in a mobile telephone conversation involving two or more individuals, there can be commonly accepted cues for ending the conversation such as a period of silence or a communicative word or phrase such as "good-bye". One party thus may disconnect without realizing that another party is still talking or wanting to talk, or may react too slowly once making such a realization. Generally, mobile telephones and networks in their conventional form are inadequate in preventing or forestalling such occurrences.

BRIEF SUMMARY

In summary, one aspect of the invention provides a method of managing termination of a telephone call, the method comprising: detecting a request by a first party to terminate a telephone call between the first party and a second party; detecting whether the second party is still speaking after detecting the request to terminate the call; and automatically forestalling termination of the call if the second party is still speaking, via affording the first party an opportunity to continue the call, via at least one of: sending a confirmation request to the first party, and sending an audio signal to the first party.

Another aspect of the invention provides an apparatus for managing termination of a telephone call, the apparatus comprising: at least one processor; and a computer readable storage medium having computer readable program code embodied therewith and executable by the at least one processor, the computer readable program code comprising: computer readable program code configured to detect a request by a first party to terminate a telephone call between the first party and a second party; computer readable program code configured to detect whether the second party is still speaking after detecting the request to terminate the call; and computer readable program code configured to automatically forestall termination of the call if the second party is still speaking, via affording the first party an opportunity to continue the call, via at least one of: sending a confirmation request to the first party, and sending an audio signal to the first party.

An additional aspect of the invention provides a computer program product for managing termination of a telephone call, the computer readable program code comprising: a computer readable storage medium having computer readable program code embodied therewith, the computer readable program code comprising: computer readable program code configured to detect a request by a first party to terminate a telephone call between the first party and a second party; computer readable program code configured to detect whether the second party is still speaking after detecting the request to terminate the call; and computer readable program code configured to automatically forestall termination of the call if the second party is still speaking, via affording the first party an opportunity to continue the call, via at least one of: sending a confirmation request to the first party, and sending an audio signal to the first party.

A further aspect of the invention provides a method comprising: conducting a telephone call between a first party and a second party, via at least one mobile telephone; detecting a request by the first party to terminate the call via detecting, at connection management software, a signal from an on-screen call disconnect button; detecting whether the second party is still speaking after detecting the request to terminate the call, via receiving an input voice signal at a voice detector; receiving signals from the voice detector and connection management software at a controller, and thereupon using the controller to: disconnect the call if no voice signal is detected; and otherwise afford continuation of the call if no disconnect signal is detected, via obtaining confirmation from the first party to continue the call.

For a better understanding of exemplary embodiments of the invention, together with other and further features and advantages thereof, reference is made to the following description, taken in conjunction with the accompanying drawings, and the scope of the claimed embodiments of the invention will be pointed out in the appended claims.

DETAILED DESCRIPTION

Figure 1:
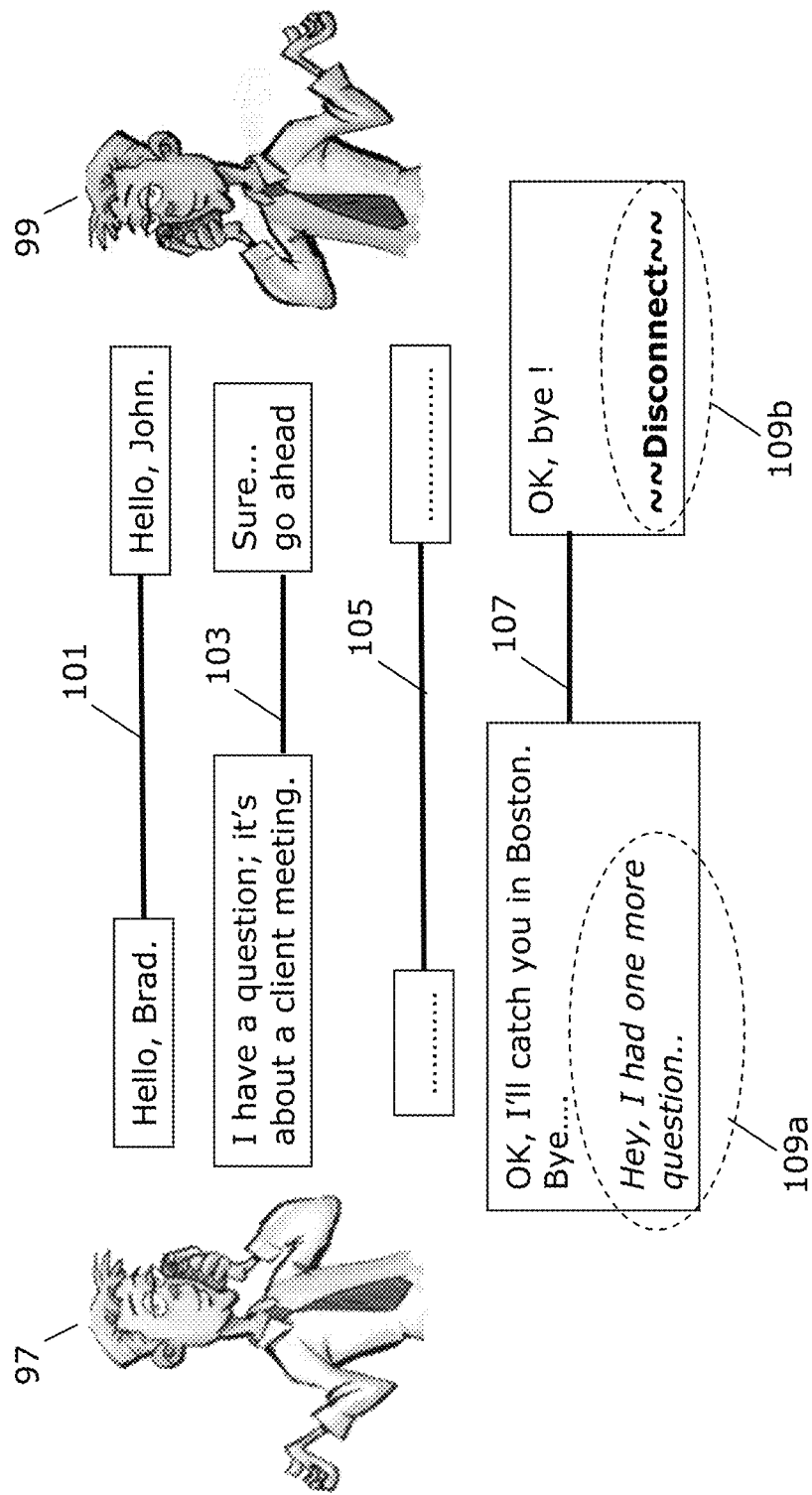
FIG. 1 depicts a commonly encountered problem surrounding the termination of mobile telephone conversations.

It will be readily understood that the components of the embodiments of the invention, as generally described and illustrated in the figures herein, may be arranged and designed in a wide variety of different configurations in addition to the described exemplary embodiments. Thus, the following more detailed description of the embodiments of the invention, as represented in the figures, is not intended to limit the scope of the embodiments of the invention, as claimed, but is merely representative of exemplary embodiments of the invention.

Reference throughout this specification to "one embodiment" or "an embodiment" (or the like) means that a particular feature, structure, or characteristic described in connection with the embodiment is included in at least one embodiment of the invention. Thus, appearances of the phrases "in one embodiment" or "in an embodiment" or the like in various places throughout this specification are not necessarily all referring to the same embodiment.

Furthermore, the described features, structures, or characteristics may be combined in any suitable manner in at least one embodiment. In the following description, numerous specific details are provided to give a thorough understanding of embodiments of the invention. One skilled in the relevant art may well recognize, however, that embodiments of the invention can be practiced without at least one of the specific details thereof, or can be practiced with other methods, components, materials, et cetera. In other instances, well-known structures, materials, or operations are not shown or described in detail to avoid obscuring aspects of the invention.

The description now turns to the figures. The illustrated embodiments of the invention will be best understood by reference to the figures. The following description is intended only by way of example and simply illustrates certain selected exemplary embodiments of the invention as claimed herein.

It should be noted that the flowchart and block diagrams in the figures illustrate the architecture, functionality, and operation of possible implementations of systems, apparatuses, methods and computer program products according to various embodiments of the invention. In this regard, each block in the flowchart or block diagrams may represent a module, segment, or portion of code, which comprises at least one executable instruction for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Specific reference will now be made herebelow to FIGS. 1-3. It should be appreciated that the processes, arrangements and products broadly illustrated therein can be carried out on, or in accordance with, essentially any suitable computer system or set of computer systems, which may, by way of an illustrative and non-restrictive example, include a system or server such as that indicated at 12' in FIG. 4. In accordance with an example embodiment, most if not all of the process steps, components and outputs discussed with respect to FIGS. 1-3 can be performed or utilized by way of a processing unit or units and system memory such as those indicated, respectively, at 16' and 28' in FIG. 4, whether on a server computer, a client computer, a node computer in a distributed network, or any combination thereof.

FIG. 1 depicts a commonly encountered problem surrounding the termination of mobile telephone conversations, in the context of at least one embodiment of the invention. Particularly shown is a two-way conversation between a caller 97 and callee 99. As shown, there are several communicative steps in such a conversation, each involving a contribution from one of the two parties 97/99, including general introduction (101), an introduction of a main topic (103), discussion of the main topic (105) and closing (107). As shown, at the closing stage 107, there is a residual exchange after both caller 97 and callee 99 say "bye" to each other. Here, caller 97 attempts to converse further (109a), only to be cut short by callee 99 disconnecting the call (109b). Broadly contemplated herein are methods and arrangements for preventing or forestalling such a problem (as also discussed in the "background" section above).

Broadly contemplated herein, in accordance with at least one embodiment of the invention, are systems and arrangements that encompass several advantageous features. For instance, if a smart phone is being used and the phone is held close to the ear, a system can ensure that the screen of the phone is switched off. When the phone is removed from the ear, e.g., for disconnecting, the screen can be reactivated (or turned on) and an on-screen button for "end call" can be displayed. At this point, a speech detecting algorithm can be used to detect audio at the other end. (If a user is using a "speaker" mode, then this option can be turned on whenever the other party is speaking.)

In accordance with at least one embodiment of the invention, in a first approach, the location of an "end call" button can be changed, and relabeled as "other person still speaking, end anyway". Thus, an on-screen "end call" button can visually transform in this manner. In another approach, in accordance with at least one embodiment of the invention, if a person selects to end the call (e.g., via pressing an on-screen "end call" button of a smartphone or a mechanical equivalent on a phone other than a smartphone), an audio signal can be given to notify that same person that the one or more other parties to the conversation is still speaking; at this point, a reconfirmation can be requested to end the call. Thus, the person initially acting to end the call can be given a prerecorded or visual (e.g., on-screen) request as to whether he/she indeed wants to end the call, or the audio signal itself can represent the request. In either scenario, the user may simply not respond in order to allow the call to continue, or may press the corresponding (on-screen or mechanical) "end call" button to terminate the call in earnest.

In a variant of the second approach noted above, in accordance with at least one embodiment of the invention, automatic speech detection can be undertaken after an "end call" button has been pressed. For this purpose, conventional processes can be used such as a voice activity detection algorithm or a speech pause detection algorithm; generally, any suitable algorithm such as these or others may be employed that are understood to work well in the presence of background noise as well as on mobile phones. Such processes can either forestall termination of the call altogether, or at least serve as a definitive trigger to send an audio signal and/or request confirmation as discussed above.

Figure 2:
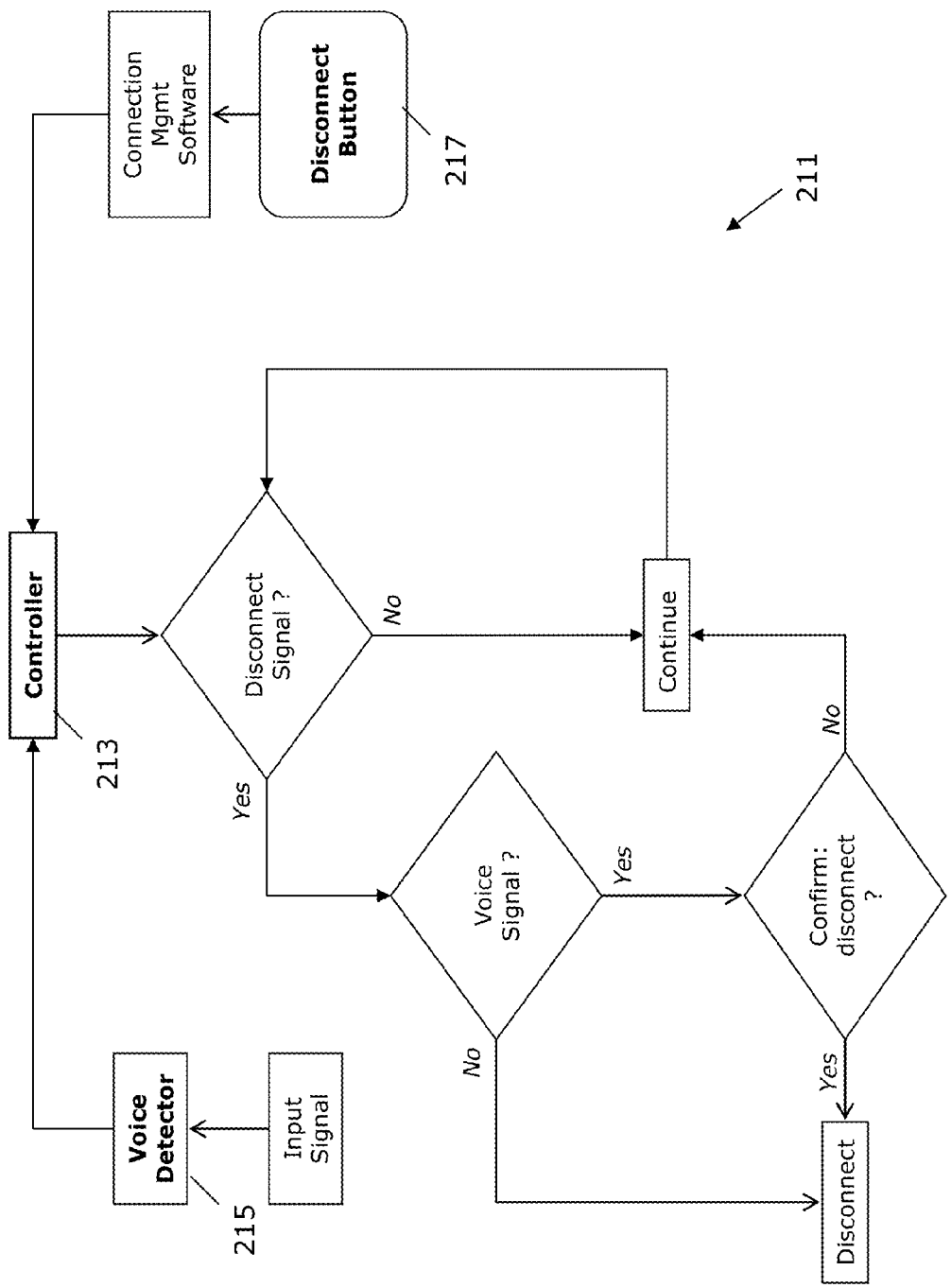
FIG. 2 schematically illustrates a process for managing the termination of a mobile telephone conversation.

FIG. 2 schematically illustrates a process 211 for managing the termination of a mobile telephone conversation, in accordance with at least one embodiment of the invention. As shown, a controller 213 accepts input originating from a voice detector 215 and disconnect button 217. The voice detector detects a voice input signal, while the disconnect button 217 (e.g., an on-screen or mechanical "end call" button as discussed above) sends a signal to connection management software upon activation, where controller 213 is thereupon also signaled. As shown, if no disconnect signal is detected, then the phone call continues. If one is detected, then a check is also made to see if there is a voice signal. If no, the call is disconnected while, if yes, a confirmation is requested of the disconnecting user as to whether he/she indeed wishes to disconnect (e.g., in a manner as discussed further above). If such confirmation is made, then the call indeed terminates (disconnects) while the call continues if not.

Figure 3:
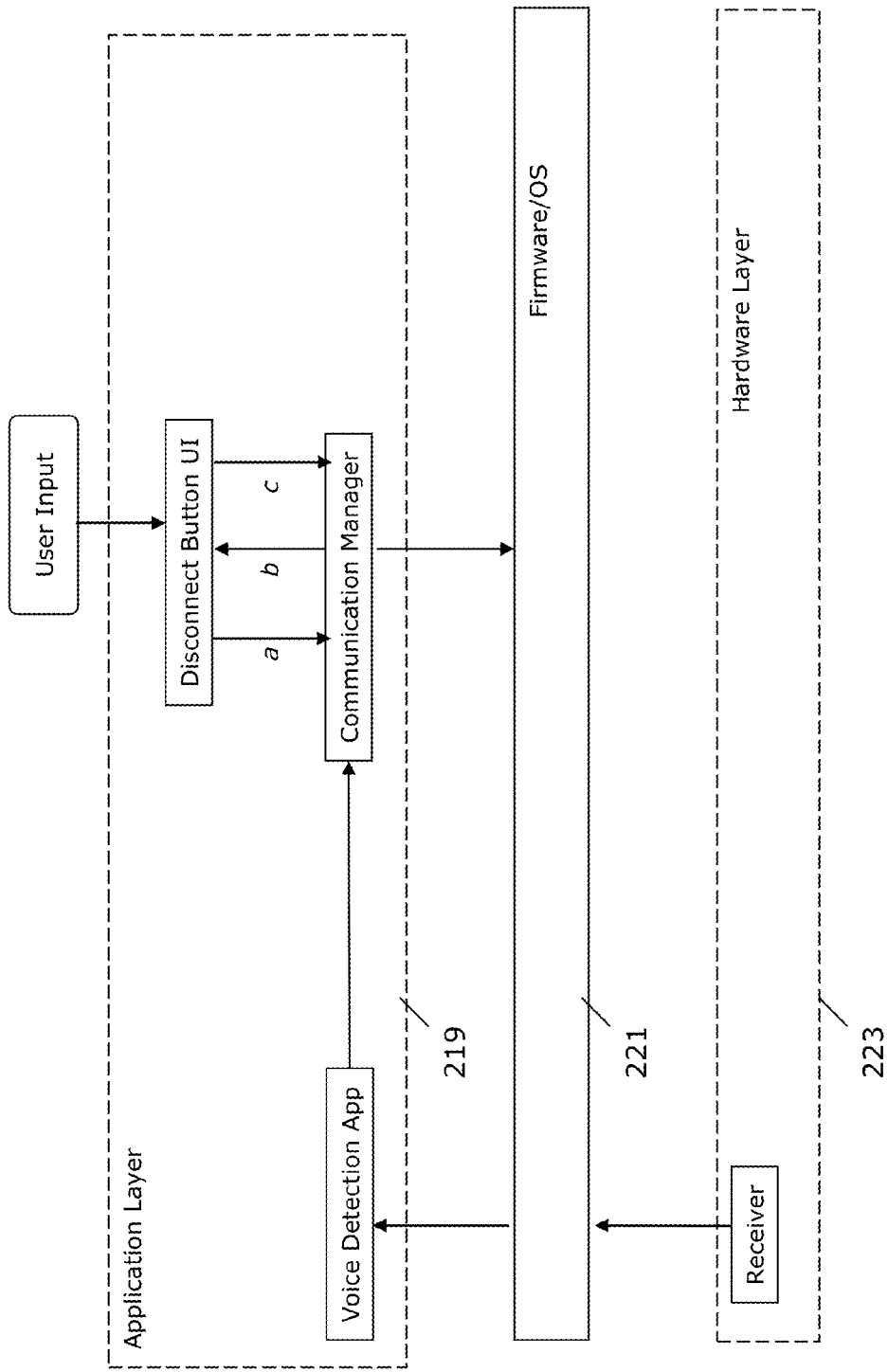
FIG. 3 schematically illustrates a system architecture for managing the termination of a mobile telephone conversation.

FIG. 3 schematically illustrates a system architecture for managing the termination of a mobile telephone conversation. An application layer 219 includes a voice detection application (app), a communication manager and a disconnect button user interface (UI). The disconnect button UI may be in the form of an on-screen or mechanical button that responds to user input. Three steps undertaken here, analogous to those discussed further above, are: a, sending a disconnect signal (from the user end); b, requesting confirmation of disconnect; and c, confirming the disconnect (from the user end). A firmware/operating system (OS) layer 221, also in communication with the communication manager 221, relays to the voice detection application a signal (or indication thereof) from a phone receiver associated with a hardware layer 223.

Figure 4:
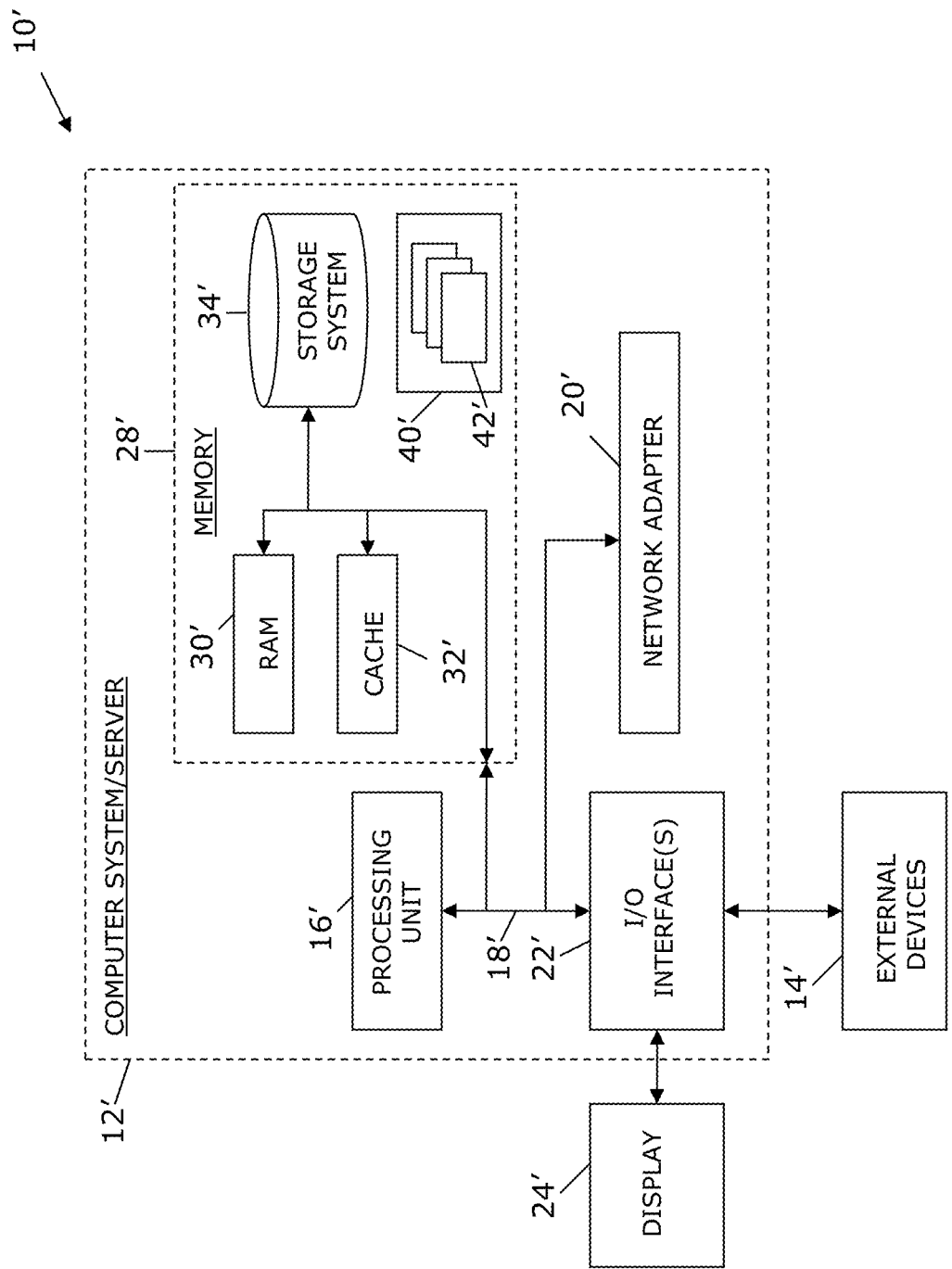
FIG. 4 illustrates a computer system.

Referring now to FIG. 4, a schematic of an example of a cloud computing node is shown. Cloud computing node 10' is only one example of a suitable cloud computing node and is not intended to suggest any limitation as to the scope of use or functionality of embodiments of the invention described herein. Regardless, cloud computing node 10' is capable of being implemented and/or performing any of the functionality set forth hereinabove. In accordance with embodiments of the invention, computing node 10' may not necessarily even be part of a cloud network but instead could be part of another type of distributed or other network, or could represent a stand-alone node. For the purposes of discussion and illustration, however, node 10' is variously referred to herein as a "cloud computing node".

In cloud computing node 10' there is a computer system/server 12', which is operational with numerous other general purpose or special purpose computing system environments or configurations. Examples of well-known computing systems, environments, and/or configurations that may be suitable for use with computer system/server 12' include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12' may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12' may be practiced in distributed cloud computing environments where tasks are performed by remote processing devices that are linked through a communications network. In a distributed cloud computing environment, program modules may be located in both local and remote computer system storage media including memory storage devices.

As shown in FIG. 4, computer system/server 12' in cloud computing node 10 is shown in the form of a general-purpose computing device. The components of computer system/server 12' may include, but are not limited to, at least one processor or processing unit 16', a system memory 28', and a bus 18' that couples various system components including system memory 28' to processor 16'.

Bus 18' represents at least one of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12' typically includes a variety of computer system readable media. Such media may be any available media that are accessible by computer system/server 12', and include both volatile and non-volatile media, removable and non-removable media.

System memory 28' can include computer system readable media in the form of volatile memory, such as random access memory (RAM) 30' and/or cache memory 32'. Computer system/server 12' may further include other removable/non-removable, volatile/non-volatile computer system storage media. By way of example only, storage system 34' can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18' by at least one data media interface. As will be further depicted and described below, memory 28' may include at least one program product having a set (e.g., at least one) of program modules that are configured to carry out the functions of embodiments of the invention.

Program/utility 40', having a set (at least one) of program modules 42', may be stored in memory 28' (by way of example, and not limitation), as well as an operating system, at least one application program, other program modules, and program data. Each of the operating systems, at least one application program, other program modules, and program data or some combination thereof, may include an implementation of a networking environment. Program modules 42' generally carry out the functions and/or methodologies of embodiments of the invention as described herein.

Computer system/server 12' may also communicate with at least one external device 14' such as a keyboard, a pointing device, a display 24', etc.; at least one device that enables a user to interact with computer system/server 12; and/or any devices (e.g., network card, modem, etc.) that enable computer system/server 12' to communicate with at least one other computing device. Such communication can occur via I/O interfaces 22'. Still yet, computer system/server 12' can communicate with at least one network such as a local area network (LAN), a general wide area network (WAN), and/or a public network (e.g., the Internet) via network adapter 20'. As depicted, network adapter 20' communicates with the other components of computer system/server 12' via bus 18'. It should be understood that although not shown, other hardware and/or software components could be used in conjunction with computer system/server 12'. Examples include, but are not limited to: microcode, device drivers, redundant processing units, external disk drive arrays, RAID systems, tape drives, and data archival storage systems, etc.

It should be noted that aspects of the invention may be embodied as a system, method or computer program product. Accordingly, aspects of the invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the invention may take the form of a computer program product embodied in at least one computer readable medium having computer readable program code embodied thereon.

Any combination of one or more computer readable media may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having at least one wire, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store, a program for use by, or in connection with, an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wire line, optical fiber cable, RF, etc., or any suitable combination of the foregoing.

Computer program code for carrying out operations for aspects of the invention may be written in any combination of at least one programming language, including an object oriented programming language such as Java®, Smalltalk, C++ or the like and conventional procedural programming languages, such as the "C" programming language or similar programming languages. The program code may execute entirely on the user's computer (device), partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the invention are described herein with reference to flowchart illustrations and/or block diagrams of methods, apparatus (systems) and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture. Such an article of manufacture can include instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

This disclosure has been presented for purposes of illustration and description but is not intended to be exhaustive or limiting. Many modifications and variations will be apparent to those of ordinary skill in the art. The embodiments were chosen and described in order to explain principles and practical application, and to enable others of ordinary skill in the art to understand the disclosure.

Although illustrative embodiments of the invention have been described herein with reference to the accompanying drawings, it is to be understood that the embodiments of the invention are not limited to those precise embodiments, and that various other changes and modifications may be affected therein by one skilled in the art without departing from the scope or spirit of the disclosure.

What is claimed is:

1. A method of managing termination of a telephone call, said method comprising:
   providing a controller which receives signals from a voice detector and connection management software;
   detecting a request by a first party to terminate a telephone call between the first party and a second party via detecting, at the connection management software, a signal from a call disconnect button;
   detecting whether the second party is still speaking after detecting the request to terminate the call, via receiving an input voice signal at the voice detector; and
   automatically forestalling termination of the call if the second party is still speaking, via affording the first party an opportunity to continue the call, via at least one of: sending a confirmation request to the first party, and sending an audio signal to the first party;
   said forestalling comprising receiving signals from the voice detector and connection management software at the controller, and thereupon:
   affording continuation of the call if no disconnect signal is detected; and
   otherwise disconnecting the call if no voice signal is detected.

2. The method according to claim 1, wherein said forestalling comprises sending a confirmation request to the first party.

3. The method according to claim 2, comprising terminating the call upon confirmation from the first party in response to the confirmation request.

4. The method according to claim 2, comprising continuing the call if the first party does not provide confirmation in response to the confirmation request.

5. The method according to claim 1, wherein the call disconnect button comprises an on-screen button.

6. The method according to claim 5, wherein said forestalling comprises conveying to the first party that the second party is still speaking, and requesting confirmation of the first party that the call is to be terminated.

7. The method according to claim 6, wherein said requesting of confirmation comprises transforming the appearance of the on-screen button in a manner to indicate that the second party is still speaking.

8. The method according to claim 1, wherein said forestalling comprises sending an audio signal to the first party if the second party is still speaking.

9. The method according to claim 8, wherein said forestalling comprises sending a confirmation request to the first party.

10. The method according to claim 9, comprising terminating the call upon confirmation from the first party in response to the confirmation request.

11. The method according to claim 1, wherein the telephone call is conducted via at least one mobile telephone.

12. The method according to claim 11, comprising:
    sending a confirmation request to the first party, and thereupon:
    terminating the call upon confirmation from the first party in response to the confirmation request; or
    continuing the call if the first party does not provide confirmation in response to the confirmation request.

13. The method according to claim 12, wherein:
    the call disconnect button comprises an on-screen button; and said sending of a confirmation request comprises conveying to the first party that the second party is still speaking, and requesting confirmation from the first party that the call is to be terminated.

14. An apparatus for managing termination of a telephone call, said apparatus comprising:
- at least one processor; and
- a non-transitory computer readable storage medium having computer readable program code embodied therewith and executable by the at least one processor, the computer readable program code comprising:
- computer readable program code configured to receive signals from a voice detector and connection management software;
- computer readable program code configured to detect a request by a first party to terminate a telephone call between the first party and a second party via detecting, at the connection management software, a signal from a call disconnect button;
- computer readable program code configured to detect whether the second party is still speaking after detecting the request to terminate the call, via receiving an input voice signal at the voice detector; and
- computer readable program code configured to automatically forestall termination of the call if the second party is still speaking, via affording the first party an opportunity to continue the call, via at least one of: sending a confirmation request to the first party, and sending an audio signal to the first party;
- the forestalling comprising receiving signals from the voice detector and connection management software, and thereupon:
- affording continuation of the call if no disconnect signal is detected; and
- otherwise disconnecting the call if no voice signal is detected.

15. A computer program product for managing termination of a telephone call, said computer readable program code comprising:
- a non-transitory computer readable storage medium having computer readable program code embodied therewith, the computer readable program code comprising:
- computer readable program code to receive signals from a voice detector and connection management software;
- computer readable program code configured to detect a request by a first party to terminate a telephone call between the first party and a second party via detecting, at the connection management software, a signal from a call disconnect button;
- computer readable program code configured to detect whether the second party is still speaking after detecting the request to terminate the call via receiving an input voice signal at the voice detector; and
- computer readable program code configured to automatically forestall termination of the call if the second party is still speaking, via affording the first party an opportunity to continue the call, via at least one of: sending a confirmation request to the first party, and sending an audio signal to the first party;
- the forestalling comprising receiving signals from the voice detector and connection management software, and thereupon:
- affording continuation of the call if no disconnect signal is detected; and
- otherwise disconnecting the call if no voice signal is detected.

* * * * *